Dec. 5, 1967 A. W. ANGERHOFER 3,355,901
CONTROL OF DEGREE OF SUPERHEAT IN EXPANSION ENGINE EXHAUST
Filed Aug. 10, 1964 5 Sheets-Sheet 1

INVENTOR
ALVIN W. ANGERHOFER
BY Jonathan Plant
ATTORNEY

FIG. 2

Dec. 5, 1967  A. W. ANGERHOFER  3,355,901
CONTROL OF DEGREE OF SUPERHEAT IN EXPANSION ENGINE EXHAUST
Filed Aug. 10, 1964  5 Sheets-Sheet 3

FIG. 3

INVENTOR
ALVIN W. ANGERHOFER
BY
ATTORNEY

Dec. 5, 1967  A. W. ANGERHOFER  3,355,901
CONTROL OF DEGREE OF SUPERHEAT IN EXPANSION ENGINE EXHAUST
Filed Aug. 10, 1964  5 Sheets-Sheet 4

FIG.4

INVENTOR
ALVIN W. ANGERHOFER
BY
Jonathan Plant
ATTORNEY 3,355,901
CONTROL OF DEGREE OF SUPERHEAT IN
EXPANSION ENGINE EXHAUST
Alvin W. Angerhofer, Edison, N.J., assignor to Air Reduction Company, Incorporated, New York, N.Y., a corporation of New York
Filed Aug. 10, 1964, Ser. No. 388,515
11 Claims. (Cl. 62—21)

This invention relates to refrigeration systems for use in cryogenic processes, and more particularly to the control of the degree of superheat in a vapor that is present in the exhaust of an expansion engine employed in a refrigeration process.

While the invention is shown and described herein with special reference to an air separation system with vaporous air in the exhaust of the expansion engine, it is to be understood that the invention is not limited to air separation processes nor to air as the vapor in the engine exhaust. In an air separation plant for example, the vapor may be nitrogen as in the case of a nitrogen expander.

A general object of the invention is to increase the thermal efficiency of cryogenic processes.

A more specific object is to increase the time rate of production of useful products in a cryogenic process, such as the production of components of air in an air separation process.

Another specific object is to increase the thermal efficiency of operation of an expansion engine or turbine in a refrigeration system wherein condensation of vapor in the exhaust is deleterious while best efficiency demands that the vapor in the exhaust be as near as may be to saturation without actual condensation.

A further object is to control the refrigerating effect of an expansion engine or turbine in such manner as to maintain a substantially constant degree of superheat in the vapor of the exhaust.

Still another object is to improve the safety of operation of a cryogenic system by automatically controlling the degree of superheat in the expander exhaust vapor at a safe value, thus reducing the chance of dangerous operation due to errors of the operator.

A feature of the invention is a control of the expansion engine or turbine inlet pressure and/or temperature to maintain exhaust pressure and temperature close to saturation conditions so as to attain the most economical use of the engine or turbine as a heat removal means, for the improvement of the efficiency of the over-all process in which the engine or turbine is used.

In cryogenic processes involving condensible fluids it is common to provide a considerable portion of the necessary refrigeration by compressing a condensible fluid of the process and thereafter expanding the fluid in a device such as an expansion engine or turbine in which the temperature of the fluid is lowered by removal of heat which is transformed into mechanical energy, thereby recovering some of the energy expended in compressing the fluid and increasing the efficiency of the refrigeration process. If a saturation condition of vapor in the exhaust of the engine or turbine occurs, condensation will result, with consequent danger of damage to the engine or turbine due to the formation of liquid in the engine. To prevent such damage it is necessary to run the engine or turbine under conditions that will assure at least a small degree of superheat in the vapor in the exhaust. To be on the safe side, it has been customary to operate with an obviously uneconomically high degree of superheat to allow for uncontrollable variations which might result in damage to the engine. To achieve the highest thermal efficiency, the exhaust vapor should be as close to saturation as possible without any condensation.

In a typical high-pressure air separation and liquefaction plant, refrigeration is accomplished by first highly compressing the intake air stream, then initially cooling the compressed air in heat exchangers against cold effluent products of the process as well as against closed cycle refrigerants such as Freon, nitrogen, etc. The air stream is then divided, a portion possibly being further cooled against very cold effluent gases and then expanded through an expansion valve or throttle and supplied to a process column. Where the column uses a reboiler, the gas passes through a reboiler coil before going to the expansion valve. The other portion of the air stream is expanded and cooled in an expansion engine or turbine and then supplied to a process column. In such a high-pressure type of plant, condensation of vapor in the engine or turbine is avoided by increasing the opening of the expansion valve or throttle, thus lowering the inlet pressure of the engine or turbine and consequently decreasing the refrigerating effect of the engine or turbine.

In a typical low-pressure air separation and liquefaction plant, it is usual to control the refrigerating effect of the expansion engine or turbine by controlling the temperature of the gas at the inlet of the engine or turbine, as by blending relatively warm gas with the cold temperature of gas or vapor fed to the inlet of the expander exhaust is prevented by increasing the proportion of warm gas in the blend.

In accordance with the invention, the pressure and/or temperature of gas or vapor fed to the inlet of the expansion engine or turbine is controlled in accordance with a measurement of the degree of superheat in the vapor in the expander exhaust.

In an embodiment of the invention illustrated herein, a closed bulb containing vapor and liquid of substantially the same composition as the process fluid in the expander is placed in thermal contact with the vapor in the expander exhaust line. The bulb is pneumatically connected to one side of a differential pressure transmitter. Expander exhaust pressure is applied to the other side of the transmitter. At temperatures above saturation, the pressure in the bulb which is saturation pressure at the temperature of the exhaust, is greater than the pressure in the exhaust line, the pressure difference increasing in proportion to the degree of superheat in the vapor in the exhaust line. An output pressure from the transmitter, proportional to the difference between the exhaust pressure and the saturation pressure at the exhaust temperature, is applied to a controller which regulates the pressure and/or temperature of the gas in the expander inlet. In the high-pressure type of system, the expander inlet pressure is controlled by regulating the pressure setting of the expansion valve or the degree of the opening of that valve. In the low-pressure type of system, the expander inlet temperature is controlled by regulating the proportion of warm and cold gases in the blend supplied to the expander inlet. In either case, the inlet pressure or temperature is controlled to maintain a small substantially constant degree of superheat in the vapor in the expander exhaust.

Other objects, features and advantages will appear from the following more detailed description of illustrative embodiments of the invention, which will now be given in conjunction with the accompanying drawings.

Figure 1:
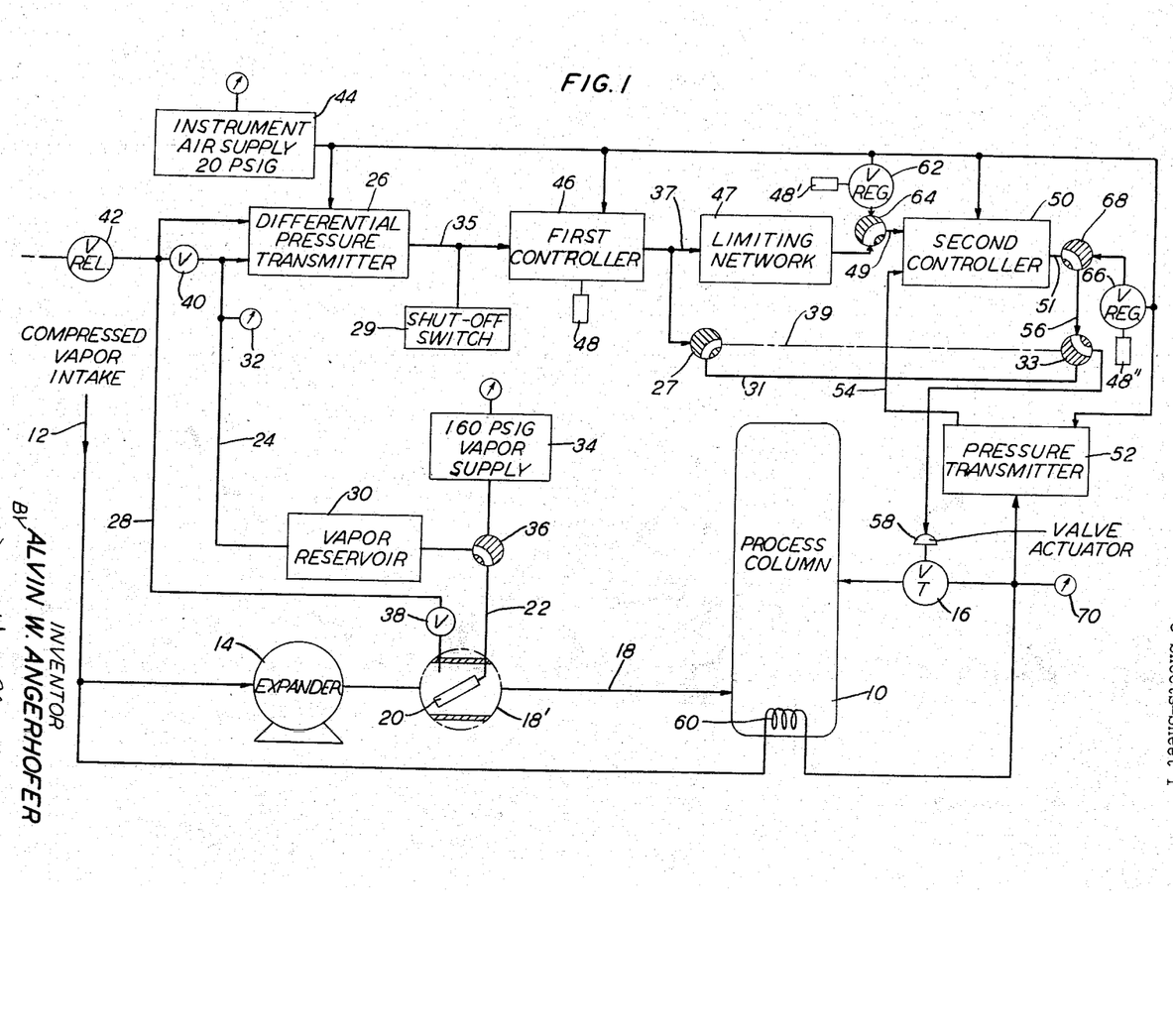
FIG. 1 is a schematic diagram or flow sheet of a portion of a cryogenic plant embodying the invention.

FIG. 1 shows a process column 10, such as the initial column of a cryogenic process, for example an air separation system. Compressed gas from an intake line 12 is divided into two parallel streams. One stream is passed through an expander 14, which may be an expansion engine or a turbine, and thence through expander exhaust line 18 to the column 10. The other stream passes by way of a reboiler coil 60 in the column 10, if such reboiler is desired, and thence through an expansion valve or throttle valve 16 to the column 10.

The exhaust line of the expander 14 is represented schematically at 18, connecting the expander to the column 10 for the delivery of expanded vapor from the expander to the lower portion of the column. It is desired that the vapor in the line 18 be as near saturation pressure and temperature as possible consistent with assurance that no condensation of the vapor shall occur in the expander. Accordingly, it is desired that the vapor in the line 18 shall be at least slightly superheated at all times.

A portion of the line 18 is shown magnified in diagrammatic form at 18′ in order to show details provided within the line structure for sensing the degree of superheat in the vapor in the line.

To measure the degree of superheat existing at any time in the vapor in the line 18, there is provided in the line in thermal contact with the vapor therein a bulb 20, preferably having a rigid copper shell, such as a length of copper tubing, connected through pressure lines 22, 24 to one side of a differential pressure transmitter 26. Another pressure line 28 is tapped into the exhaust line 18 and communicates the pressure therein to the other side of the transmitter 26.

The bulb 20 contains material of substantially the same composition as the vapor in line 18, for example air in an air separation plant. The material in the bulb 20 is at the same temperature as the vapor in the line 18 but at a somewhat higher pressure, so that the material in the bulb is composed of vapor and liquid in contact with each other. Accordingly, a condition of saturation exists within the bulb 20 so that the pressure in the bulb and connecting lines 22 and 24 is substantially the saturation pressure of the material at the temperature existing in the line 18. The pressure differential between the bulb and the line is known to be substantially proportional to the degree of superheat in the vapor in the line 18.

With air as the working fluid, the condensate in the bulb 20 is rich liquid, that is, a liquid which is richer in oxygen than atmospheric air, while the vapor above the liquid is lean in oxygen compared to atmospheric air. The equilibrium pressure of the lean air in contact with the rich liquid is somewhat higher than would hold for air over a liquid having the same composition as the air. The result as it affects the use of the bulb pressure as an indication of the superheat in the vapor in the line 18 is a falsely high indication of saturation pressure. The effect is minimized by adding a vapor reservoir 30 connected to the tubing 22, 24 so that the volume of air is made relatively great compared to the volume of rich liquid condensate in the bulb 20. A remaining error not corrected in this manner is balanced out in a way which will appear below.

To facilitate filling and pressurizing the bulb 20 and reservoir 30, a pressure gauge 32 is connected to the line 24, preferably at a point close to the inlet side of the differential pressure transmitter 26, and a source 34 of high pressure vapor, for example 160 p.s.i.g., is connected to line 22 through a three-way valve 36. Also, a pressure shutoff valve 38 is provided in line 28, a by-pass valve 40 is provided between the two inlet lines of the pressure differential pressure transmitter 26, and a relief valve 42 leading to the atmosphere is connected to line 28 preferably near the valve 40.

In an embodiment which was successfully used with air as the vapor, the vapor bulb 20 is in a six-inch length of one-half inch outside diameter soft copper tubing, capped at one end and swaged at the other end to a one-quarter inch outside diameter stainless steel tube. The bulb is inserted in a four-inch exhaust line 18 with the bulb sloped so that the tip is within one-half inch of the bottom of the line. Copper is preferred for the material of the bulb to give good heat transfer between the bulb and the process stream in the exhaust line. Stainless steel is preferred for the pressure line leading from the bulb to reduce heat transfer between the tube and its surroundings, in order to reduce temperature effects of the ambient temperature on the bulb. Precautions are taken to make the bulb and connecting passages extremely airtight to prevent leakage from the bulb system.

A preferred procedure for filling and pressurizing the bulb 20, reservoir 30 and lines 22, 24 with air will now be described. Filling air, preferably clean and dry, usually available at high pressure in the inlet portion of the air separation plant, is adjusted in pressure to about 160 p.s.i.g. and stored in the supply unit 34. The three-way valve 36 being in the position connecting the bulb 20 to the reservoir 30 and transmitter 26, the shut-off valve, 38 is closed, the by-pass valve 40 is opened, and the vent valve 42 is opened to atmosphere. This operation releases to atmospheric pressure the air in the bulb, the reservoir, and the inlets to the transmitter 26. Next, the vent valve 42 and by-pass valve 40 are closed, the pressure valve 38 is opened, and the three-way valve 36 is thrown to connect the 160 p.s.i.g. air supply 34 to the reservoir 30 and the inlet to the transmitter through the line 24. When the pressure has become equalized as shown by a reading of about 160 p.s.i.g. on the gauge 32, the three-way valve 36 is thrown to connect the bulb 20 to the reservoir 30 and line 24, to close off the 160 p.s.i.g. supply 34. With the system in operation, the low temperature of the vapor in the line 18 causes condensation of air in the bulb 20, with consequent reduction of the pressure in the bulb and connected members to the equilibrium pressure at the temperature of the line 18, for example about 105 p.s.i.g. at a temperature of about −273.2° F., which pressure is applied to one inlet of the transmitter 26. The pressure of line 18 for example about 75 p.s.i.g., is applied through the valve 38 to the other inlet of the transmitter 26.

The refrigerating power of the expander 14 is substantially proportional to the differential pressure between its inlet and exhaust. Since the exhaust opens into the process column 10, the exhaust pressure is determined by the pressure in the column. The refrigerating power then depends upon the inlet pressure of the expander and can be varied by increasing or decreasing the opening of the valve 16.

It is possible to regulate the degree of superheat in the vapor in the exhaust of the expander 14 by taking the differential pressure output from the transmitter 26, comparing it with a reference pressure and deriving an operating pressure for actuating the valve 16 so as to vary the refrigerating power in such manner as to maintain a substantially constant degree of superheat.

I find it advantageous in many instances, however, to employ a cascade control in order to obtain greater flexibility in control operations and to restrict the expander pressures within reasonable limits.

The differential pressure transmitter 26 is a known type of device which receives two pressure inputs together with a substantially constant pressure input from a source 44, commonly referred to as instrument air, for example at a pressure such as 20 p.s.i.g. The difference in pressure between the two pressure inputs, on lines 24 and 28, respectively, is employed in the transmitter 26 to control a portion of the 20 p.s.i.g. air supply to give an output or measurement pressure in a range from about 3 to 15 p.s.i.g., which output is substantially proportional to the differential pressure to be measured and thus in the present case substantially proportional to the degree of superheat in the vapor in the line 18.

The output from the transmitter 26 is a pressure output or measurement signal which is impressed upon one input of a first controller 46. The controller 46 has a manually setting member or set point mechanism 48 which can be set to the desired value of the measurement signal, the setting of which may be calibrated, in the present case, to read the desired degree of superheat, taking into account and compensating for any residual error due to any false indication of saturation pressure as above mentioned, if such an error exists. The controller 46 receives instrument air from the source 44 and gives an output which varies over a range such as 3 to 15 p.s.i.g. under the control of the measurement signal and of the manual setting member 48.

The over-all function of the controller 46 is to generate a corrective signal, in the form of a pneumatic pressure output signal in a line 37 which will ultimately cause a change in the cryogenic process such that the input signal in the line 35 to the controlled 46 will be the same as a set point pressure input to the controller 46 which is determined by a manual setting of the member 48. In the present case, the change in the process is effected by applying the corrective signal by way of the line 37 to the second controller 50 as a set point input in the form of a pneumatic pressure. The function of the second controller 50 is to generate a signal which is applied to the valve actuator 58, which in turn controls the valve 16 to raise or lower the expander inlet pressure, causing the degree of superheat to drop or rise accordingly until the measurement signal in the line 35, representing the degree of superheat, equals the set point input in the controller 46.

More particularly, the output from the first controller 46 is impressed upon one input of the second controller 50, in cascade with controller 46, by way, if desired, of a limiting network 47 followed by a three-way valve 64. A second input is impressed upon the controller 50 over a line 54 from the output of a pressure transmitter 52 the input of which is connected to the inlet side of the expansion valve 16. The transmitter 52 serves to measure the inlet pressure at the valve 16, which pressure is substantially the same as the inlet pressure at the expansion engine 14. The first mentioned input to the controller 50 serves to adjust a set point pressure for the controller, determining therein a desired value of the expander inlet pressure.

The more immediate function of the controller 50 is to generate a corrective signal, in the form of a pneumatic pressure output signal in a line 51 which will cause the desired change in the cyrogenic process. This change will be such that the input in the line 54 to the controller 50 will match the input in line 49. In the present instance, the change in the process is effected by applying the corrective signal to the valve actuator 58 to open or close the valve 16. Any deviation of the expander inlet pressure from the set point value varies the output pressure of the controller 50 from the value for the matched state and causes the valve actuator to change the opening of the valve. The changes in the valve opening are arranged to be in such sense as to restore the system to the desired state. In the present case, it will be evident that valve opening is to be changed in such sense as to tend to restore the expander inlet pressure to the value called for by the set point input on the line 49 to controller 50.

If at any time it is desired to set the valve 16 to give a desired value of the expander inlet pressure irrespective of the degree of superheat then existing, the three-way valve 64 may be given a quarter turn to connect the source 44 through a throttle valve 62 to the input of the controller 50 in place of the set pressure output from the controller 46. The valve 62 may then be adjusted to give a pressure input to the controller 50 which will result in the control of the valve 16 by the controller 50 to give the desired expander inlet pressure, which latter may be read from a pressure gauge 70. Alternatively, if desired, the valve 16 may be set directly by means of air pressure from the source 44 adjusted by a throttle valve 66, in which case, the three-way valve 68 is to be turned a quarter turn so as to connect the valve 66 to the line 56 in place of the output from the controller 50.

If direct control of the valve 16 by the measurement signal from the differential pressure transmitter 26 is desired, the three-way valves 27 and 33 may each be turned a quarter turn so as to connect the output of the controller 46 through the valve 27, a line 31 and the valve 33 to the valve actuator 58.

In a system which has been successfully operated, and which was designed to operate with a normal pressure of 2500 p.s.i.g. at the expander inlet, safety considerations required that the variations in this pressure not carry the pressure above about 2750 p.s.i.g. in order to avoid opening safety valves, nor below about 1800 p.s.i.g. At this lower pressure limit, the valve 16 began to let into the column 10 a process stream at such high velocity as to cause disturbance to the process in the column or danger to internal parts of the column, or both. To hold the expander inlet pressure within the desired limits, the device 47, which comprises a limiting network, is so designed that no pressure outside predetermined limits can be transmitted through the network 47 to the controller 50. When either limit is exceeded at the input to the device 47, the opening of the valve 16 remains unchanged until the pressure returns within the limits. When the controller 46 calls for more expander inlet pressure than the device 47 will permit, the refrigeration rate remains at a fixed high rate and the superheat increases above the desired value and remains there until normal conditions can be re-established. On the other hand, if the controller 46 calls for less expander pressure than the device 47 will permit, the refrigeration remains at a fixed low rate, but the superheat may continue to drop dangerously near zero.

To save the expansion engine from damage due to condensation therein, under this contingency, shut-off switch 29 may be set to operate at a predetermined lower limit of pressure in the output of the transmitter 26 and arranged to shut down the plant or a portion thereof, so that the difficulty can be resolved.

In an illustrative case, the limiting network 47 may transmit pressures in the range from 5 to 13 p.s.i.g. and the switch 29 may operate whenever the pressure falls to a value which corresponds to 5 p.s.i.g. in the network 47.

The function of either of the throttle valves 62 and 66 may in some cases be performed by the manual set member 48, since the member 48 is commonly a means for obtaining a measured pressure that can be set at any value within the range of the source 44, for example the range from 3 to 15 p.s.i.g. Since the member 48 is not otherwise needed when either the valve 62 or the valve 66 is to be connected to the system, the measured pressure controlled by the member 48 may then be supplied either to the three-way valve 64 in place of the output from the throttle valve 62 or to the three-way valve 68 in place of the output from the throttle valve 66 by means of suitable connecting lines as will be evident to those skilled in the art.

Figure 2:
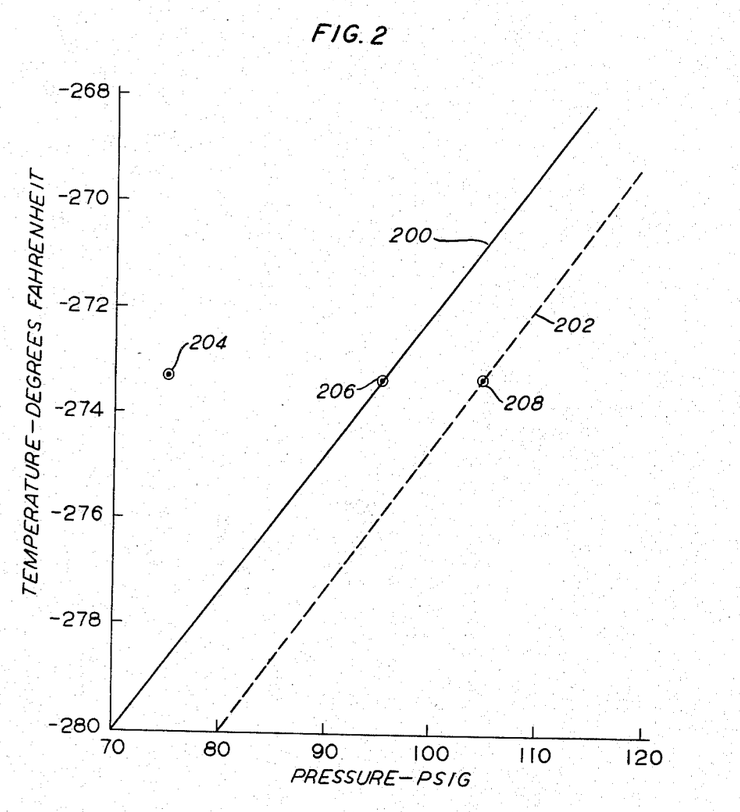
FIG. 2 is a graph of pressure-temperature relations in the expander exhaust of a system such as that shown in FIG. 1.

FIG. 2 shows a temperature-pressure saturation line 200 for air, together with a broken line 202 representing an experimentally determined temperature-pressure relationship obtained for air in a bulb like the bulb 20 shown in FIG. 1. The experimental data for the line 202 was obtained with a bulb that was initially charged with air at 160 p.s.i.g. and a temperature of 75° F. The lines 200 and 202 are substantially parallel and separated by a pressure difference of approximately 9.5 p.s.i. An illustrative operating point of the vapor in the line 18 is shown at 204 where the vapor pressure is 75 p.s.i.g. and the temperature is −273.2° F. At this temperature, the saturation pressure of the air in the line 18 is 95 p.s.i.g. as shown at point 206, and the pressure in the bulb 20 is approximately 105 p.s.i.g. as shown at point 208. A system that was successfully controlled at this operating point had a normal inlet pressure in the expansion engine of approximately 2500 p.s.i.g.

While the operating point 204 corresponds to a superheat of about five degrees Fahrenheit, this represents a very conservative operating condition. Control apparatus presently available is capable of much closer control, so that experience gained in actual operation of a plant will generally permit very economical operation, approaching one degree or less of superheat in the usual air separation plant. For comparison, it should be noted that it had been customary to avoid possible damage to the expansion engine by operating with 10 to 20 degrees of superheat with consequent decrease in production of liquid product.

Figure 3:
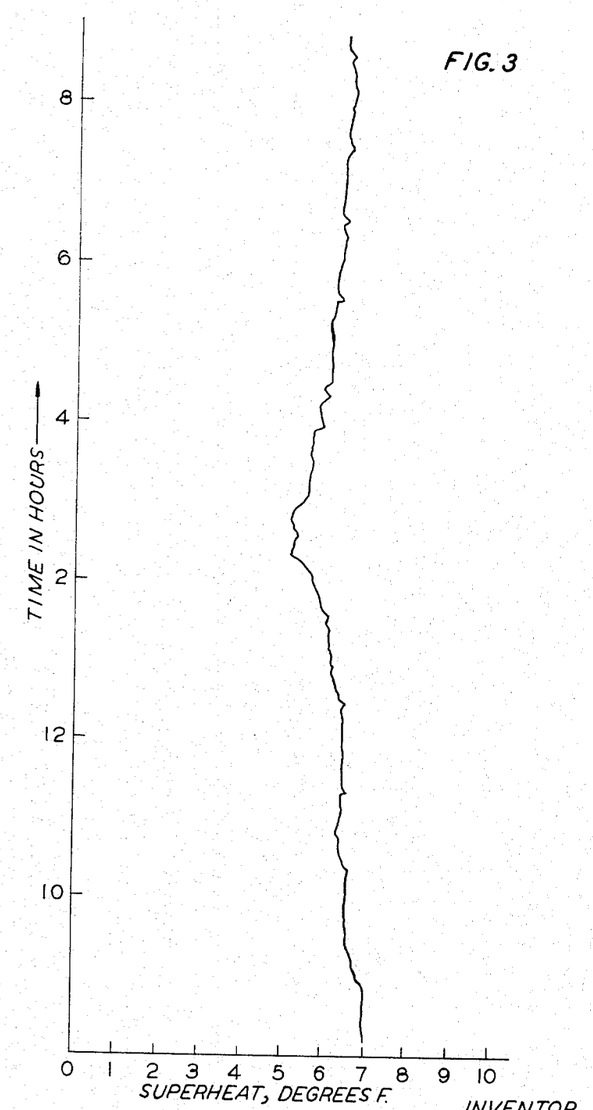
FIG. 3 is a graph showing the typical variation of the degree of superheat in the vapor in the expander exhaust of a conventional air separation plant over a period of about thirteen hours without automatic control of the kind disclosed herein.
Figure 4:
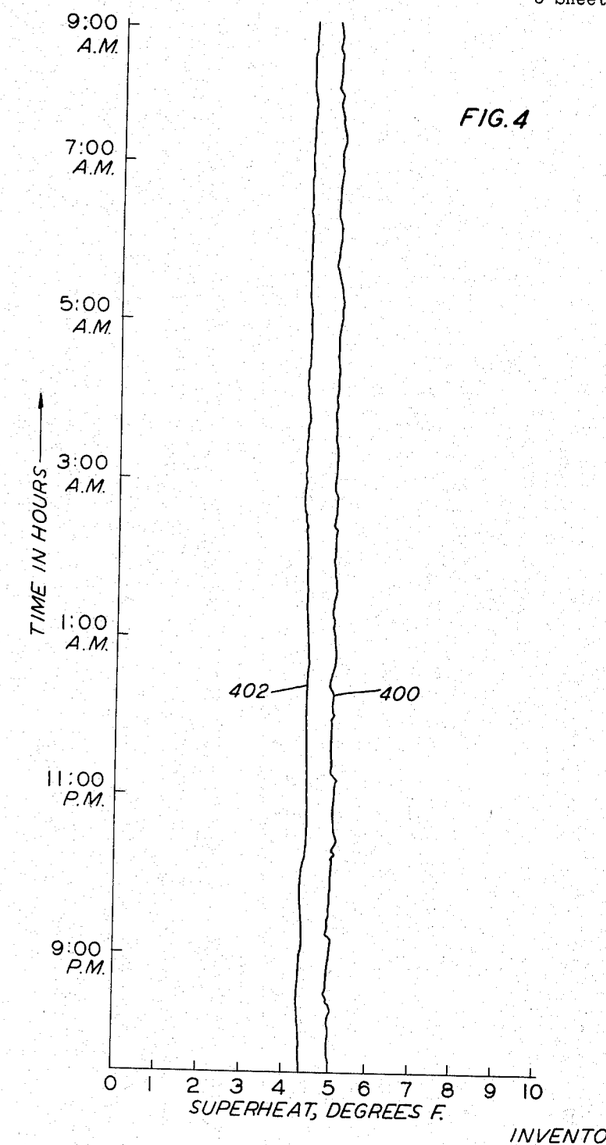
FIG. 4 is a graph showing the high degree of constancy of the degree of superheat over a similar period of time with automatic control in accordance with the invention.

In a typical high pressure air separation plant running without the automatic control of expander exhaust superheat disclosed herein, but with the superheat recorder visible to the plant operator, a recorder record was made of the variations of degree of superheat over a twelve hour period. The record is shown in FIG. 3, wherein the degree of superheat is seen to vary considerably. The maximum superheat is about 7° F. and the minimum about 5° F. After installation and adjustment of the automatic control system according to the invention, a similar recorder record was made over another twelve hour period with results as shown in FIG. 4. Here the superheat is seen to be controlled very closely to about 5° F. The graph 400 shows the degree of superheat. A second graph 402 shows accompanying slight variations in the inlet pressure of the expander which occurred during the operation of the control.

Figure 5:
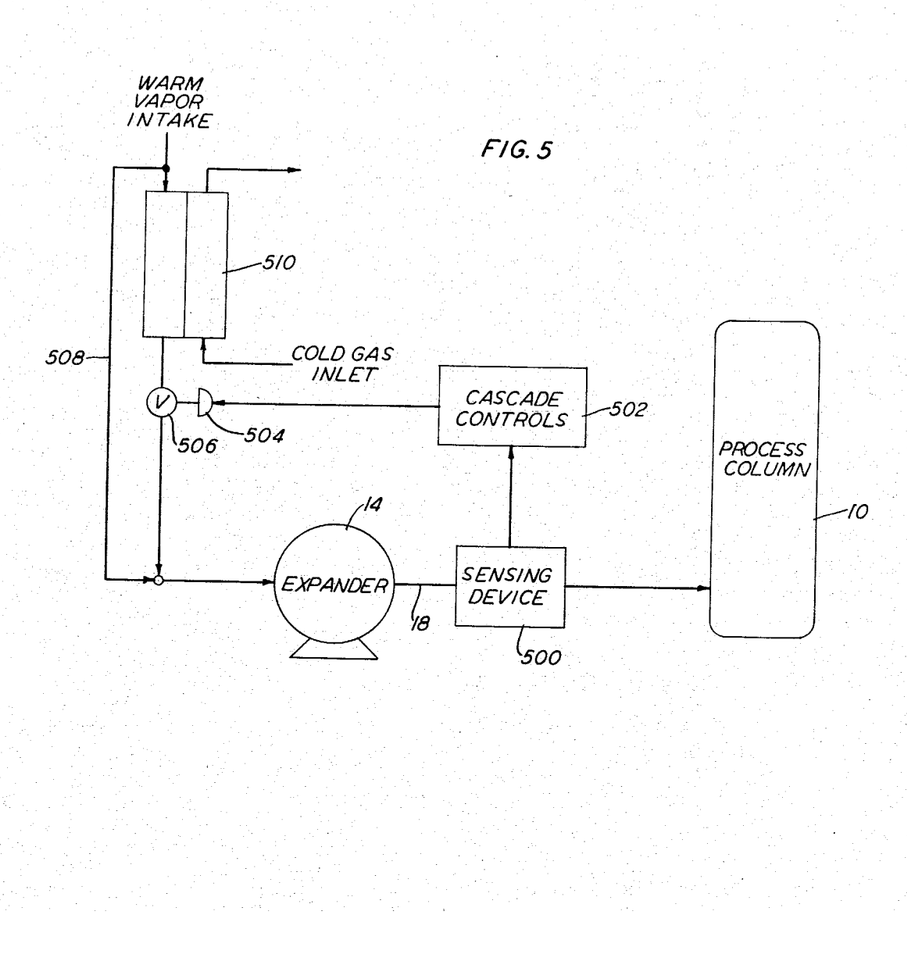
FIG. 5 is a schematic diagram or flow sheet of a portion of a cryogenic plant showing another embodiment of the invention.

FIG. 5 shows an alternative arrangement, particularly for use in a low pressure plant, for varying the degree of superheat in the expander exhaust in response to sensed deviations from the desired value of the degree of superheat. The control system, which may be of the type shown in FIG. 1, is represented schematically in FIG. 5 by a sensing device 500 in the expander exhaust line 18 between the expander 14 and the process column 10; together with cascade controls 502 represented by a block, the output of which cascade controls is connected to a valve actuator 504 which in turn controls the degree of opening of a valve 506.

The valve 506 controls the inlet temperature of vapor delivered to the inlet of the expander 14, thus in turn controlling the temperature of the vapor in the exhaust of the expander. Specifically, in the embodiment illustrated in FIG. 5, relatively warm vapor is mixed with relatively cold vapor at the inlet of the expander 14. The relatively warm vapor is obtained by diverting a portion of the warm vapor intake of the system through a conduit 508 directly to the inlet of the expander 14. The relatively cold vapor is obtained at the outlet of a counter-current heat exchanger 510 in which warm vapor from the warm vapor intake is cooled against cold gas, usually derived from the cryogenic process. The valve 506 regulates the relative amount of cold vapor supplied to the inlet of the expander. By this means the degree of superheat in the expander exhaust can be kept substantially constant with substantially the same kind of control system shown in FIG. 1.

Suitable pneumatic devices for use in practicing the invention are available on the market, for example from the Foxboro Company, Foxboro, Massachusetts, and Honeywell Company, Philadelphia, Pennsylvania. A suitable differential pressure transmitter 26 is the Foxboro Model 11DM. A suitable device for the first and second controllers 46 and 50 is the Minneapolis-Honeywell Teleset Cascade Controller Model 51323, equipped with primary and secondary control units Model 52201. A suitable pressure transmitter 52 is the Foxboro Model 11GM. A suitable limiting network 47 consists of the Moore Model 58L low limit relay and Model 58M high limit relay.

It will be evident that control means other than pneumatic devices may be used for performing the control functions described and shown herein. Other control means that are available include electrical control devices, for example direct current controls using currents in the 10 to 50 milliampere range, and alternating current controls operating on 115 volts. Mechanical controls and hydraulic controls are also available. The invention is not to be limited to any specific type of control devices.

The benefit from the use of the invention in an air separation plant appears in the form of an increase in the daily tonnage produced by the plant, particularly in the production of liquid products such as liquid oxygen and liquid nitrogen. The cost of the extra control equipment and its installation is offset in a few months by the value of the increased output of liquid product. The increase in daily tonnage of liquid production realized by practicing the invention may run as high as one percent increase for each two degrees reduction in the operating value of the superheat.

While illustrative forms of apparatus and methods in accordance with the invention have been described and shown herein, it will be understood that numerous changes may be made without departing from the general principles and scope of the invention.

I claim:

1. The method of controlling the degree of superheat in the vapor in the exhaust of a vapor expansion engine, which method comprises the steps of developing a pressure signal which measures the said degree of superheat, measuring the inlet pressure of said engine, comparing said pressures to obtain a differential signal, and using said differential signal to regulate the said inlet pressure to maintain a substantially constant degree of said superheat.

2. The method of controlling the degree of superheat in the vapor in the exhaust of a vapor expansion engine, which method comprises the steps of measuring the vapor pressure in said exhaust, developing a pressure indicative of the saturation pressure of said vapor at the temperature existing in said exhaust, comparing said vapor pressure and said saturation indicative pressure to obtain a differential pressure indicative of the said degree of superheat in said vapor, using said differential pressure to develop a control signal, and using said control signal to change a condition at the inlet of the engine in such sense as to maintain a substantially constant degree of said superheat.

3. The method according to claim 2, in which the said control signal is used to change the pressure at the inlet of the engine in the said manner.

4. The method according to claim 2, in which the said control signal is used to change the temperature at the inlet of the engine in the said manner.

5. In a refrigeration system in combination, an expansion engine for expanding vapor and designed to operate with a desired degree of superheated vapor in the exhaust thereof to the exclusion of condensed liquid therein, the temperature in the exhaust of said engine being a function of a condition at the inlet side of the engine, means to maintain said exhaust vapor at a substantially constant desired degree of superheat, including means to measure the degree of superheat existing in the exhaust vapor, further means to develop a measurement signal representative of a deviation of the degree of superheated vapor in the exhaust from the desired value based in part on a pressure reading in the exhaust vapor of the engine, and means actuated by said signal to alter the said condition at the inlet side of the engine in such sense as to restore said degree of superheat to the said desired value thereof.

6. Apparatus according to claim 5, in which the said condition at the inlet side of the engine is the pressure thereat and in which said means actuated by said signal is effective to alter the temperature at the inlet side of the engine.

7. Apparatus according to claim 5, in which the said condition at the inlet side of the engine is the temperature thereat and in which said means actuated by said signal is effective to alter the temperature at the inlet side of the engine.

8. In a refrigeration system, in combination, an expansion engine for expanding vapor and designed to operate with superheated vapor in the exhaust thereof, the said engine developing a level of refrigeration dependent upon the inlet pressure of the said engine, a control device, means to develop a first measurement signal representative of a deviation of the degree of superheated vapor in the exhaust from a desired value, means to impress said measurement signal upon said control device as a set point signal therein representative of a desired value of the said inlet pressure of the expander, means to develop a second measurement signal representative of the said inlet pressure of the expander, means to impress said second measurement signal upon said control device along with said set point signal to develop a third signal, and means actuated by said third signal to vary said inlet pressure of the expander in such sense as to restore said degree of superheat to the said desired value thereof.

9. In a refrigeration system, in combination, an expansion engine for expanding vapor and designed to operate with superheated vapor in the exhaust thereof to the exclusion of condensed liquid therein, the temperature in the exhaust of said engine being a function of a condition at the inlet side of the engine, means coupled to the exhaust of the engine for sensing the pressure differences existing between the pressure of the expanded vapor in said exhaust and the saturation pressure of a vapor of substantially the same composition as said expanded vapor at the temperature existing in said exhaust, said pressure difference being substantially proportional to the degree of superheat of said expanded vapor, means to develop a measurement signal representative of said pressure difference, and means actuated by said signal to alter the condition at the inlet side of the engine in such sense as to restore said degree of superheat to the said desired value thereof.

10. In a refrigerating system for a cryogenic process, in combination, an expansion engine, a valve for controlling the inlet pressure impressed upon said engine to control the level of refrigeration developed by the engine, means coupled to the outlet of said engine for sensing a first pressure difference existing between the pressure of an expanded vapor in said outlet and the saturation pressure of a vapor of substantially the same composition as said expanded vapor at the temperature existing in said outlet, said pressure difference being substantially proportional to the degree of superheat of said vapor, means to develop a first derived pressure that is a function of said first pressure difference, means to develop a second derived pressure that is a function of the inlet pressure of the engine, means responsive to a second pressure difference existing between said first and second derived pressures to adjust said valve in such sense that a decrease in said degree of superheat causes an increase in the opening of the valve, thereby decreasing the refrigerating effect of the engine and increasing the said degree of superheat, and an increase in said degree of superheat causes a decrease in the opening of the valve, thereby increasing the refrigerating effect of the engine and decreasing the said degree of superheat, whereby the engine is controlled to maintain a substantially constant degree of superheat in said vapor in the engine outlet.

11. In a refrigeration system for a cryogenic process, in combination, an expansion engine, pressure control means for controlling the inlet pressure impressed upon said engine to control in turn the level of refrigeration developed by the engine, differential pressure sensing means, a bulb containing in contact with each other, vapor and liquid of substantially like composition to the fluid in vapor phase existing in the exhaust of said engine, the contents of said bulb being in thermal equilibrium with said exhaust fluid, means for simultaneously impressing upon said differential pressure sensing means the pressure in said exhaust in opposition to the equilibrium pressure in said bulb, whereby there is obtained a first pressure output signal substantially proportional to the difference between the two applied pressures, said pressure output signal being substantially proportional to the degree of superheat of the vapor in the engine exhaust; first control means responsive to said first pressure output signal, a first set point mechanism in said first control means whereby there may be manually selected a first set point pressure representative of a desired degree of superheat, said control means functioning to generate a second pressure output signal when the said first pressure output signal differs from said first set point pressure, a transducer responsive to the inlet pressure of the expansion engine for producing a third pressure output signal substantially proportional to the said inlet pressure; a second control means including a second set point mechanism, means to impress said second pressure output signal upon said second set point mechanism whereby said second set point mechanism is pneumatically set to generate a second point pressure substantially proportional to a specific value of the said inlet pressure, said second control means functioning to produce a fourth pressure output signal responsive to the difference between the said third pressure output signal and the said second set point pressure, and means to apply said fourth pressure output signal to said pressure control means for controlling the inlet pressure in such sense as to reduce the said difference between said third pressure output signal and said second set point pressure, whereby the reduction of the said difference results in a reduction of the difference between said first pressure output signal and said first set point pressure, thereby regulating the degree of superheat to be substantially constant at the selected value.

References Cited
UNITED STATES PATENTS

| | | | |
|---|---|---|---|
| 2,355,894 | 8/1944 | Ray | 62—225 |
| 2,641,114 | 6/1953 | Holthaus | 62—38 X |
| 2,675,884 | 4/1954 | Deanesly | 62—38 X |
| 3,038,318 | 6/1962 | Hanny. | |

NORMAN YUDKOFF, *Primary Examiner.*

V. W. PRETKA, *Assistant Examiner.*

UNITED STATES PATENT OFFICE
CERTIFICATE OF CORRECTION

Patent No. 3,355,901                                                  December 5, 1967

Alvin W. Angerhofer

It is hereby certified that error appears in the above numbered patent requiring correction and that the said Letters Patent should read as corrected below.

Column 2, lines 25 to 27, strike out "temperature of gas or vapor fed to the inlet of the expander exhaust is prevented by increasing the proportion of warm gas in the blend." and insert instead -- gas at the inlet. In this case, condensation in the expander exhaust is prevented by increasing the proportion of warm gas in the blend. --; column 4, line 10, strike out "in"; line 44, after "line 24," insert -- and --; column 5, line 29, for "controlled" read -- controller --; column 7, line 29, for "operator" read -- operators --.

Signed and sealed this 10th day of June 1969.

(SEAL)
Attest:

EDWARD M. FLETCHER, JR.                      WILLIAM E. SCHUYLER, JR.
Attesting Officer                                        Commissioner of Patents